(12) United States Patent
Ko et al.

(10) Patent No.: US 12,007,528 B2
(45) Date of Patent: Jun. 11, 2024

(54) METHOD AND SYSTEM OF VERIFYING INCREASE IN PRECIPITATION

(71) Applicant: National Institute of Meteorological Sciences, Seogwipo-si (KR)

(72) Inventors: A-Reum Ko, Seogwipo-si (KR); Ki-Ho Chang, Seoul (KR); Jung Mo Ku, Seogwipo-si (KR); Woonseon Jung, Seogwipo-si (KR)

(73) Assignee: National Institute of Meteorological Sciences, Seogwipo-si (KR)

( * ) Notice: Subject to any disclaimer, the term of this patent is extended or adjusted under 35 U.S.C. 154(b) by 104 days.

(21) Appl. No.: 17/681,225

(22) Filed: Feb. 25, 2022

(65) Prior Publication Data
US 2023/0228908 A1    Jul. 20, 2023

(30) Foreign Application Priority Data
Jan. 17, 2022   (KR) .......................... 10-2022-0006287

(51) Int. Cl.
*G01W 1/14*   (2006.01)
*G01W 1/08*   (2006.01)

(52) U.S. Cl.
CPC ................ *G01W 1/14* (2013.01); *G01W 1/08* (2013.01)

(58) Field of Classification Search
CPC .................................. G01W 1/14; G01W 1/08
See application file for complete search history.

(56) References Cited

FOREIGN PATENT DOCUMENTS

| KR | 20100071143 A | * | 6/2010 |
| KR | 20180019412 A | * | 2/2018 |

\* cited by examiner

*Primary Examiner* — Manish S Shah
*Assistant Examiner* — Sharad Timilsina
(74) *Attorney, Agent, or Firm* — You & IP, LLC

(57) ABSTRACT

Provided are a method and system of verifying an increase in precipitation. The precipitation increase verification method includes: obtaining a first piece of observation information from an upwind area after a seeding experiment; obtaining a second piece of observation information from a downwind area; comparing the first piece of observation information with the second piece of observation information, and thus determining whether or not the first piece of observation information and the second piece of observation information fall within a linear scope; and determining that an effect resulting from the seeding experiment can be proved when the first piece of observation information and the second piece of observation information fall within the linear scope.

9 Claims, 7 Drawing Sheets

METHOD AND SYSTEM OF VERIFYING INCREASE IN PRECIPITATION

BACKGROUND OF THE INVENTION

Field of the Invention

Embodiments of the present invention relate to a method and system of verifying an increase in precipitation.

Description of the Related Arts

An experiment for an artificial increase in snow (or precipitation) has been utilized, as a way for securing representative water resources having high efficiency at a low cost in order to prepare for a drought, in U.S.A., China, Israel, and so on.

The artificial increase in snow (or precipitation) is a technology that causes a lot of rain to fall, or rain to previously fall on other regions by promoting the development of a cloud through seeding of cloud condensation nuclei CCN or ice nuclei IN artificially serving as cloud seeds in a cloud which does not develop into a precipitation cloud. In the summer season, an artificial rainfall, which causes artificial rain to fall through the collision and combination processes of vapor and droplets, can be performed by a process of seeding a warm cloud (i.e., a cloud having a temperature of 0° C. or more) with calcium chloride ($CaCl_2$) or sodium chloride (NaCl) used as cloud seeds, which is a hygroscopic material, and in the winter season, an artificial increase in snow, which causes artificial snow to fall, can be performed by a process of seeding a cool cloud (i.e., a cloud having a temperature of 0° C. or below) with silver iodide (AgI) used as cloud seeds, which generates ice crystals.

The experiment for the artificial increase in snow (or precipitation) is divided into an aerial experiment for directly seeding a cloud with cloud seeds from the sky using an aircraft according to each position at which seeding of the cloud seeds is carried out, and a ground experiment for seeding a cloud adjacent to the ground with cloud seeds using the ground burner of a mountainous region.

In order for both of the aerial experiment and the ground experiment to be carried out as successful experiments, although it is important to perform an experimental design and experimental operation, an amount of precipitation which increases as a result of these experiments is more important than anything else, and it is required to verify effects resulting from the experiments in order to scientifically prove whether or not the increasing amount of precipitation really increased due to the experiments.

FIG. 1 is a flow chart for explaining a physical verification method used in an aerial experiment for an artificial rainfall using cloud physics-based aerial observation equipment by in-situ observations according to a conventional art.

Referring to FIG. 1, in step S10, observation information before seeding is obtained. The observation information may be obtained by measuring a minute physical change in a cloud is measured. After the observation information before seeding is obtained, in step S20, seeding of cloud seeds is carried out.

After seeding, in step S30, observation information after seeding is obtained. After then, in step S40, as observation data of the aerial observation equipment are compared with each other during the period in which straight observations after completion of the experiment and before seeding are performed, and the period in which straight observations after seeding are performed, a minute physical change in the cloud after seeding of the cloud seeds can be identified.

In the physical verification method with regard to seeding according to the conventional art, since the observation information before seeding is compared with that after seeding, no influx of an external cloud, and so on, which may occur in a seeding process, have been considered. Accordingly, it has been problematic in that a seeding effect could not accurately be analyzed.

Recently, it has been becoming very important to analyze effects resulting from seeding due to a climatic change. That is, in order to prove the growth of cloud droplets occurring in the cloud by seeding of cloud seeds after an experiment for an artificial rainfall, and an increase in precipitation shown on the ground thereby, a demand for a physical verification method having higher accuracy has increased.

SUMMARY OF THE INVENTION

The present invention, which has been made for solving the aforesaid problems, provides a method and system of verifying an increase in precipitation that can accurately verify an effect resulting from a seeding experiment.

According to one aspect of an embodiment of the present invention intended for solving the aforesaid problems, the precipitation increase verification method may comprise: obtaining a first piece of observation information from an upwind area after a seeding experiment; obtaining a second piece of observation information from a downwind area; comparing the first piece of observation information with the second piece of observation information, and thus determining whether or not the first piece of observation information falls within a linear scope based on the second piece of observation information; and determining that an effect resulting from the seeding experiment can be proved when the first piece of observation information falls within the linear scope based on the second piece of observation information.

The observation information may comprise vertical observation information and straight observation information.

The precipitation increase verification method may further comprise deciding that a different cloud feature was induced into at least one of the upwind area and the downwind area when the first piece of observation information and the second piece of observation information deviate from the linear scope.

The first piece of observation information or the second piece of observation information may be obtained by at least one piece of aerial observation equipment.

The at least one piece of aerial observation equipment may comprise: an aerial data investigation system (i.e., Aircraft Integrated Meteorological Measuring System-20); a water content measurement instrument (i.e., Multi-Element Water Content System); a cloud particle combination measurement instrument (i.e., Cloud Combination Probe); and a precipitation particle measurement instrument (i.e., Precipitation Imaging Probe).

According to another aspect of an embodiment of the present invention, the precipitation increase verification system may comprise: an observation information acquisition unit configured to obtain a first piece of observation information from an upwind area and a second piece of observation information from a downwind area after a seeding experiment; and a comparison and analysis unit configured to compare the first piece of observation information with the second piece of observation information so as to determine whether or not the first piece of observation information falls within a linear scope based on the second piece of observation information, and determine that an effect resulting from the seeding experiment can be proved when the first piece of observation information falls within the linear scope based on the second piece of observation information.

The comparison and analysis unit may decide that a different cloud feature was induced into at least one the upwind area and the downwind area when the first piece of observation information deviates from the second piece of observation information.

The precipitation increase verification system may further comprise an observation information quantification unit configured to quantify at least one of the first piece of observation information and the second piece of observation information.

The observation information quantification unit may quantify at least one of the first piece of observation information and the second piece of observation information at an average water concentration of a cloud according to each size of cloud particles.

The precipitation increase verification system may further comprise a seeding effect analysis unit configured to analyze a seeding effect resulting from the seeding experiment.

According to the embodiments of the present invention, an effect resulting from an aerial experiment for an artificial rainfall can be verified. Furthermore, a minute physical change in the cloud occurring due to seeding can be proved by utilization of cloud physics-based observation equipment which is mounted into an experimental aircraft so that scientific reliability can be enhanced.

DETAILED DESCRIPTION OF THE INVENTION

Figure 1:
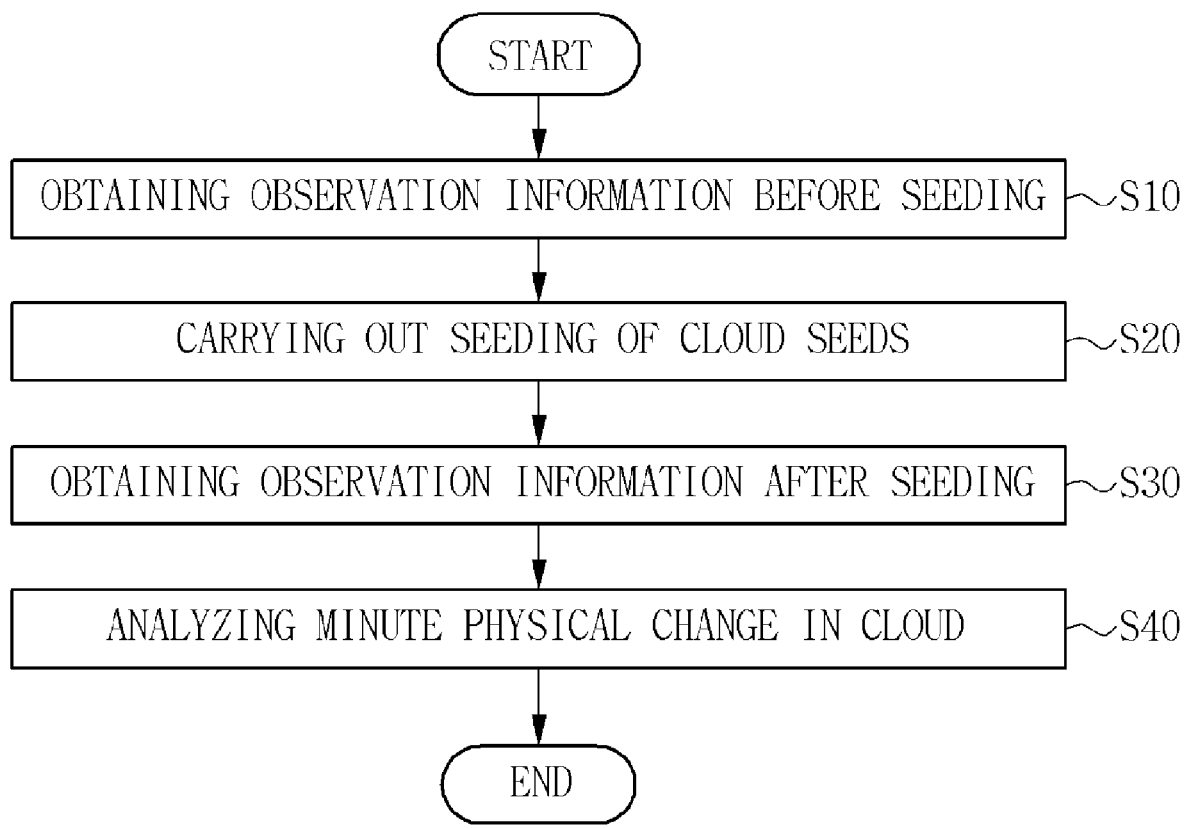
FIG. 1 illustrates a flow chart showing a method of verifying an increase in precipitation according to a conventional art.

Hereinafter, embodiments of the present invention will be described in detail with reference to the accompanying drawings. In the following description with regard to embodied forms, it is to be noted that, when the detailed description of convention conventional functions or elements related with the present invention may make the gist of the present invention unnecessarily unclear, the detailed description thereof will be omitted. Also, it should be understood that the sizes of the elements shown in the drawings may be exaggeratedly drawn, and do not mean actually applied sizes.

Figure 2:
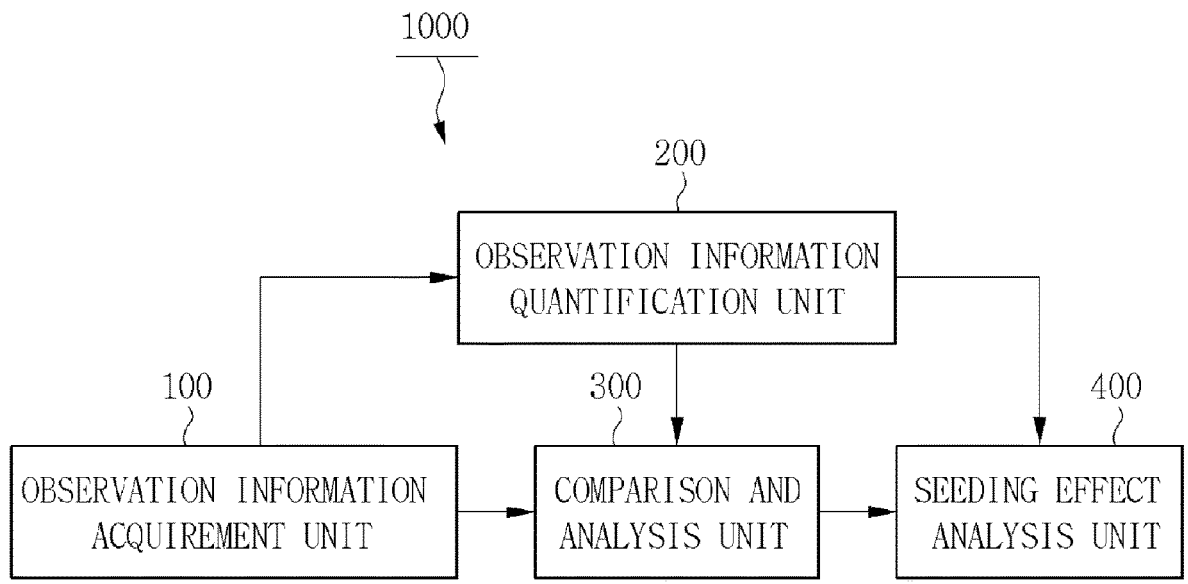
FIG. 2 illustrates a block diagram showing a physical verification system used in an aerial experiment for an artificial rainfall according to one embodiment of the present invention.

FIG. 2 illustrates a block diagram showing a physical verification system used in an aerial experiment for an artificial rainfall according to one embodiment of the present invention.

Referring to FIG. 2, the block diagram of the physical verification system used in the aerial experiment for the artificial rainfall is illustrated.

After seeding intended for an artificial rainfall is carried out, the physical verification system 1000 used in the aerial experiment for the artificial rainfall according to the present invention obtains observation information after seeding, and determines whether or not a seeding effect can be proved based on the observation information. If the seeding effect can be proved, the physical verification system 1000 used in the aerial experiment for the artificial rainfall may analyze the seeding effect using the observation information.

Referring to FIG. 2, the physical verification system 1000 used in the aerial experiment for the artificial rainfall comprises: an observation information acquisition unit 100; an observation information quantification unit 200; a comparison and analysis unit 300; and a seeding effect analysis unit 400.

The observation information acquisition unit 100 may obtain observation information after a seeding experiment. The observation information may be obtained by at least one piece of aerial observation equipment. The aerial observation equipment may be installed in an experimental aircraft. The observation information acquisition unit 100 may comprise a piece of aerial observation equipment 110 illustrated in FIG. 3.

Figure 3:
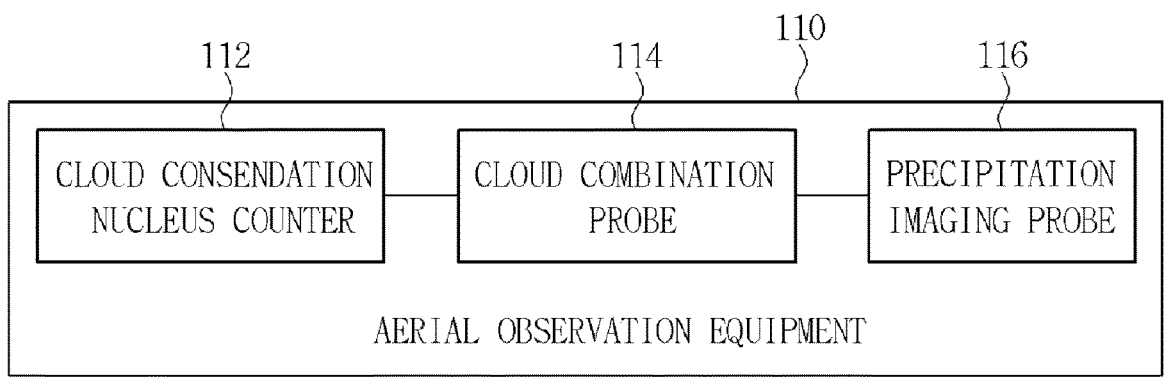
FIG. 3 is a block diagram showing aerial observation equipment according to another embodiment of the present invention.
Figure 4:
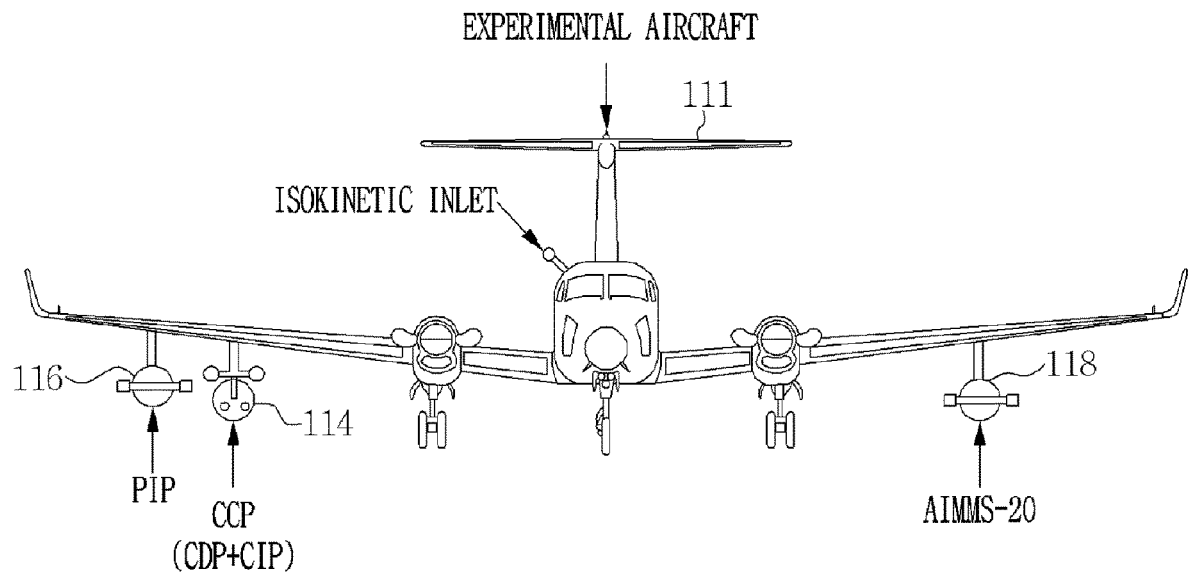
FIG. 4 is a view illustrating aerial observation equipment arranged in an experimental aircraft according to the other embodiment of the present invention.

FIG. 3 is a block diagram showing a piece of aerial observation equipment according to another embodiment of the present invention, and FIG. 4 is a view illustrating the aerial observation equipment arranged in an experimental aircraft according to the other embodiment of the present invention.

Referring to FIG. 3, the aerial observation equipment 110 may be installed in the experimental aircraft 111 illustrated in FIG. 4, and may obtain observation information after seeding. The observation information may comprise vertical observation information and straight observation information.

More specifically, the aerial observation equipment 110 may be arranged in the experimental aircraft 111, may measure the vertical observation information falling within a linear scope in an area which reaches the bottom of a cloud from the top thereof, or the lowest flight altitude from the top of the cloud, or measure the vertical observation information falling within a linear scope in an area which reaches the top of the cloud from the bottom thereof, or the top of the cloud from the lowest flight altitude, and may measure the straight observation information in an area which reaches a seeding altitude from the bottom of a cloud, a seeding altitude from the lowest flight altitude, the top of the cloud from the bottom thereof, or the top of the cloud from the lowest flight altitude.

The aerial observation equipment 110 may comprise: a cloud condensation nucleus counter 112; a cloud combination probe 114; and a precipitation imaging probe 116.

The cloud condensation nucleus counter 112 observes the size distribution of aerosol that acts as a condensation nucleus of the cloud. The cloud condensation nucleus counter 112 is equipment that can observe aerosols having a size ranging from 0.75 μm to 10 μm and capable of acting as cloud condensation nuclei.

More specifically, the cloud condensation nucleus counter 112 is arranged in the inside of the experimental aircraft 111, and observes aerosols that flow through an isokinetic inlet.

The cloud combination probe 114 observes the size distribution and shape of aerosols, cloud droplets, and small precipitation particles.

Explaining more particularly, the cloud combination probe 114 is equipment that can observe the size distribution and shape of aerosols and small cloud droplets having a size ranging from 2 μm to 50 μm as well as the size distribution and shape of cloud droplets and small precipitation particles having a size ranging from 7.5 μm to 930 μm. For this, the cloud combination probe 114 may comprise a cloud particle measurement instrument (i.e., Cloud Droplet Probe CDP) and a cloud image measurement instrument (i.e., Cloud Imaging Probe CIP).

Also, the precipitation imaging probe 116 observes the size distribution and shape of large cloud droplets and precipitation particles.

More particularly, the precipitation imaging probe 116 is equipment that can observe the size distribution and shape of large cloud droplets and precipitation particles having a size ranging from 100 μm to 6200 μm.

Alternatively, the observation information acquisition unit 100 may further comprise an aerial data investigation system 118 (i.e., Aircraft Integrated Meteorological Measuring System-20, AIMMS-20) configured to measure the location information (i.e., latitude, longitude an altitude, and so on) of a flight path and a meteorological status (i.e., an atmospheric temperature, humidity, a direction of the wind, a speed of the wind, a vertical speed, and so on), or a water content measurement instrument (i.e., Multi-Element Water Content System, WCM-2000) configured to observe a total water content (resulting from adding a liquid water content to an ice water amount).

Meanwhile, the experimental aircraft 111 may comprise flame-shaped burnt carbon holders (capable of mounting 12 holders into each wing, namely, 24 holders in the maximum number) in two wings of the experimental aircraft that sprays artificial cloud seeds for the seeding experiment.

The observation information acquisition unit 100 may obtain a first piece of observation information and a second piece of observation information through the aerial observation equipment 112, 114, 116, or 118.

After the seeding experiment is carried out, the observation information after the seeding experiment is obtained. It is important to set up and decide a seeding line in the seeding experiment. It is effective for the seeding line to be located at a point and altitude that the largest liquid water content of the cloud exists.

Figure 5:
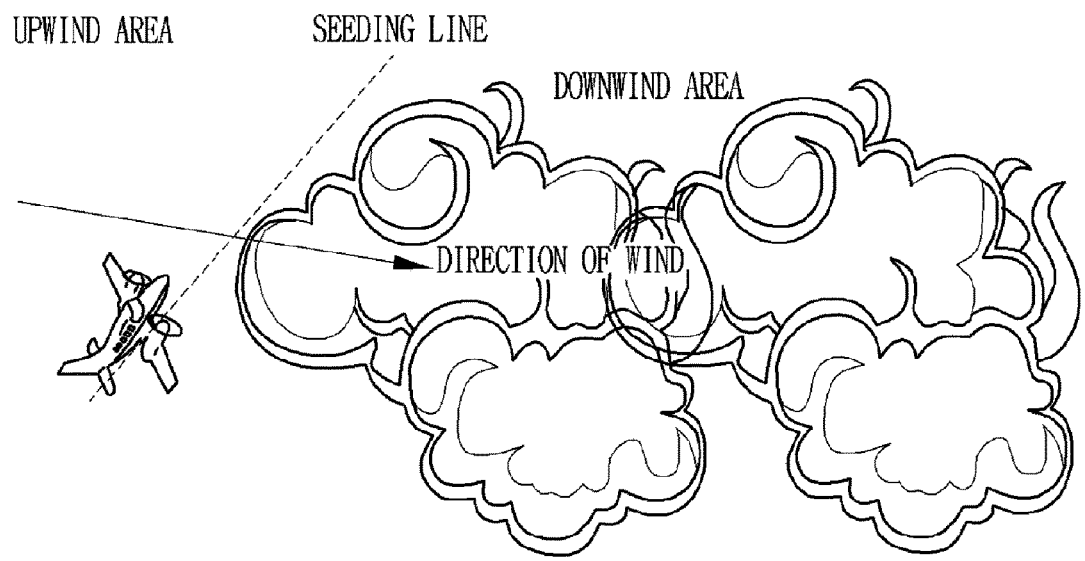
FIG. 5 is a view for explaining a seeding line and a direction of the wind which are shown in case of an artificial rainfall.
Figure 6:
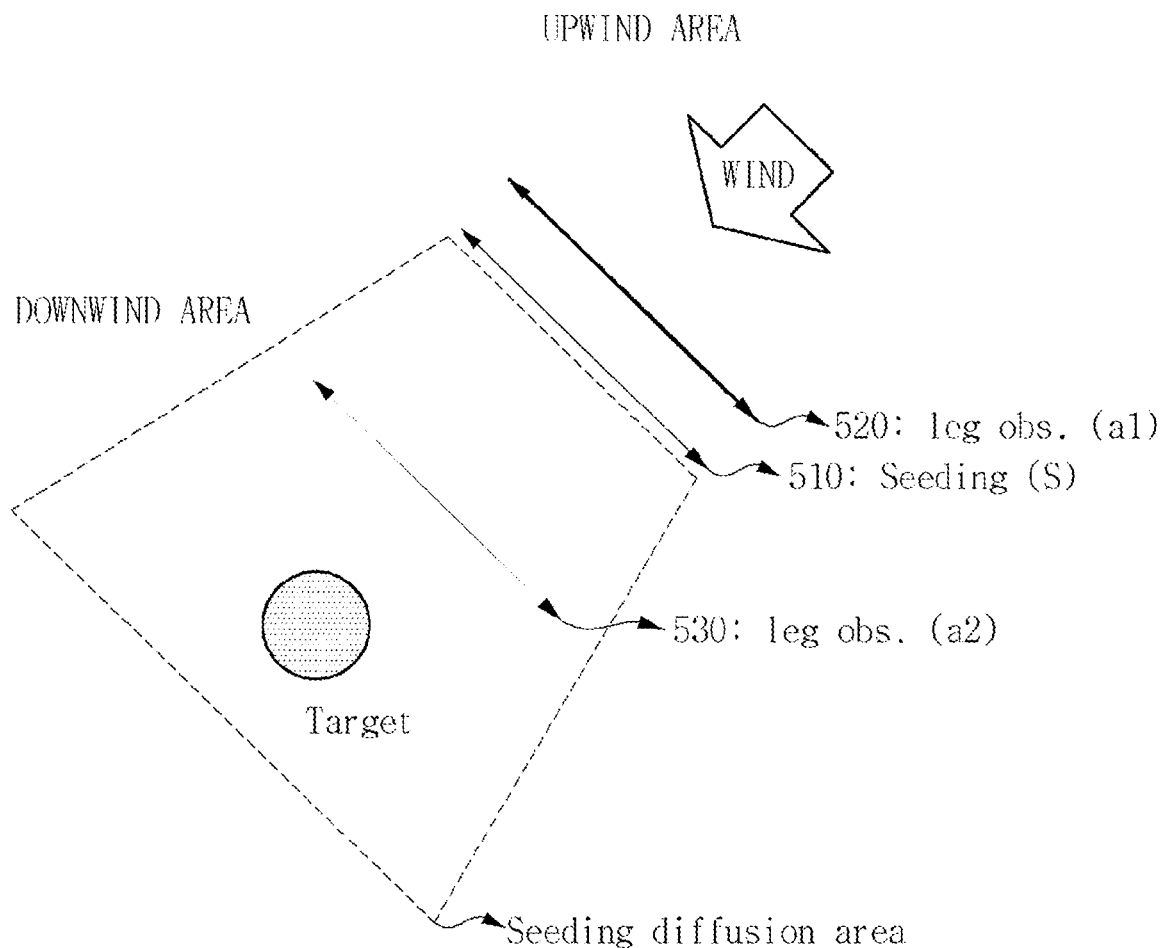
FIG. 6 is a view schematically showing the view shown in FIG. 5.

FIG. 5 is a view intended for explaining a seeding line and a direction and the wind which are shown in case of an artificial rainfall. FIG. 6 is a view schematically showing the view shown in FIG. 5.

Referring to FIG. 5 and FIG. 6, generally, a seeding line is established roughly perpendicular to a direction of the wind. The seeding line 510 is located at an upwind area, and is generally designed so that a seeding material is diffused into a target region located at the downwind area. The experimental aircraft 111 sprays the seeding material while moving along the seeding line, and consequently the seeding material can be diffused into the direction of the wind. The quadrilateral area indicated in a dotted line as shown in FIG. 6 is an area in which the seeding material is diffused. The seeding material hardly exists in the upwind area due to the direction of the wind.

For example, the experimental aircraft 111 makes a round-trip flight along the seeding line 510, each of left and right lengths of which is about 10 km (i.e., the total length of 20 km), from an experimental position (i.e., the target shown in FIG. 6), which is finally decided, into a direction perpendicular to the main direction of the wind, and sprays the seeding material. At this time, the seeding material causes flame-shaped burnt carbon of each wing to be lighted by the selection of each appropriate seeding amount, such as one and two shots in the cloud, three shots in case that turbulence is strong, and four shots when icing is observed at the experimental aircraft 111, or rainwater is observed on a window.

When seeding is completed, the observation information may be obtained by straight observations 520 performed in an outside area which is at least 5 mile or more away from the seeding line. This information is used in deciding whether or not a natural cloud flowed into an area which is not affected by the seeding material, and comparing this cloud with the cloud targeted for the experiment existing in an area which is affected by the seeding material.

After then, as straight observations are performed in the inside area (i.e., the downwind area) of the seeding line, the second piece of observation information may be obtained. This observation information is used in observing a cloud feature changed due to seeding in the area which is affected by the seeding material (i.e., the downwind area).

Since the atmosphere has the property of a fluid, it moves the clouds with the lapse of time. That is, since the atmosphere is affected by a direction and speed of the wind, a moving direction and speed of the cloud are changed.

Observing the inside area and outside area of the seeding line after the completion of seeding in a fixed direction of the wind as shown in the present invention largely has two advantages. First, whether or not a cloud having a different feature flowed during seeding can be identified. For example, about one hour is required for completely burning 24 shots of the seeding material one by one. That is, since there is a high possibility that a cloud having a different feature in addition to the target cloud existing in an experimental region will additionally flow during seeding, whether or not the additional cloud flowed may be identified as the outside area of the seeding line is observed.

The second advantage is that the area which is affected by the seeding material after seeding can directly be compared with the area which is not affected by the seeding material. Since a moving speed (i.e., about 100 m/s) of the aircraft compared with a moving speed (i.e., about 10 m/s) of the atmosphere is about ten times faster than that of the atmosphere, it is appropriate for comparison of effects of the seeding material shown in the same cloud systems to observe the inside area and outside area of the seeding line after completion of the seeding (in case that no additional cloud flows).

The observation information acquisition unit 100 provides the observation information quantification unit 200 and the comparison and analysis unit 300 with the observation information obtained by the aerial observation equipment, or outputs the observation information. The observation information quantification unit 200 may quantify at least one of the first piece of observation information and the second piece of observation information.

The first piece of observation information may be measured from the cloud in the outside (i.e., upwind) area of the seeding line, and the second piece of observation information may be measured from the cloud in the inside (i.e., downwind) area of the seeding line.

The observation information quantification unit 200 may quantify the first piece of observation information and/or the second piece of observation information at an average water concentration according to each size of precipitation particles of the clouds. Alternatively, the observation information quantification unit 200 may express a cloud feature shown in the upwind area and a cloud feature shown in the downwind area as a graph.

The observation information quantification unit 200 is not an essential constituent element of the physical verification system used in the aerial experiment for the artificial rainfall, and may selectively be included in the physical verification system used in the aerial experiment for the artificial rainfall.

The comparison and analysis unit 300 may receive the first piece of observation information and the second piece of observation information from the observation information acquisition unit 100 and may compare the first piece of observation information with the second piece of observation information.

Specifically, the comparison and analysis unit 300 may determine whether or the first piece of observation information falls within a linear scope based on the second piece of observation information by comparing the first piece of observation information with the second piece of observation information.

The comparison and analysis unit 300 may determine that the seeding experiment is effective when the first piece of observation information falls within the linear scope based on the second piece of observation information. That is, the comparison and analysis unit 300 may determine that an increase in precipitation occurred due to seeding when the first piece of observation information falls within the linear scope based on the second piece of observation information.

Figure 7:
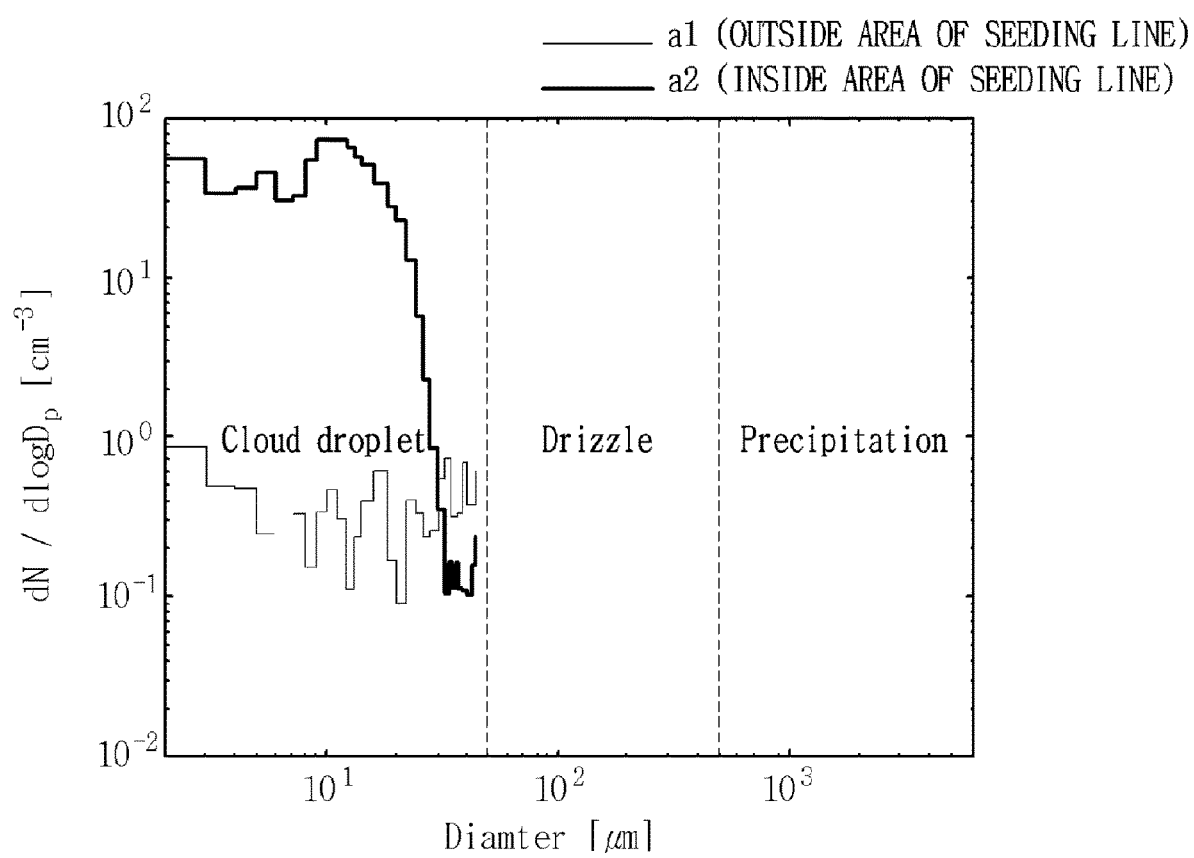
FIG. 7 is a graph showing one example of a first piece of observation information and a second piece of observation information according to the present invention.
Figure 8:
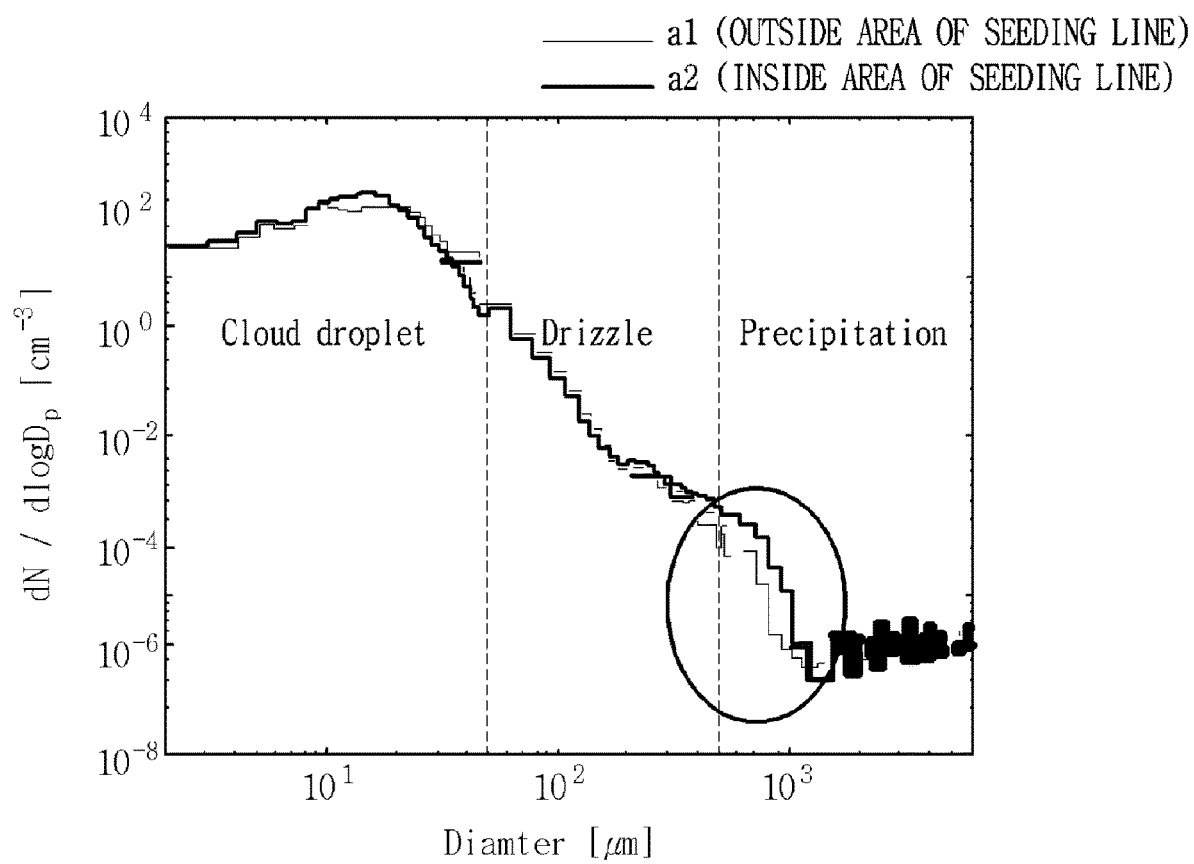
FIG. 8 is a graph showing another example of the first piece of observation information and the second piece of observation information according to the present invention.

FIG. 7 is a graph showing one example of the first piece of observation information and the second piece of observation information according to the present invention, and FIG. 8 is a graph showing another example of the first piece of observation information and the second piece of observation information.

In FIG. 7 and FIG. 8, the lines indicated by A1 represent an average water concentration according to each size of cloud particles in the outside area (i.e., the upwind area) of the seeding line, and the lines indicated by A2 represent an average water concentration according to each size of cloud particles in the inside area (i.e., the downwind area) of the seeding line.

Referring to FIG. 7, cloud features shown in two areas, the inside area (i.e., a region in which the seeding material is diffused) and the outside area (i.e., a region which is not affected by the seeding material) are different from each other, and in this case, there is a doubt as to the influx of an external main cause.

For example, in FIG. 7, the distribution of cloud droplet particles existing in the upwind area and the distribution of cloud droplet particles existing in the downwind area are considerably different from each other. Accordingly, it may be identified that the interference (i.e., the inflow) of an external cloud into the downwind area exists. That is, it may be identified that a cloud having a feature different from that of the cloud existing in the upwind area flowed into the downwind area.

Referring to FIG. 8, it may be found that the cloud feature shown in the downwind area is similar to that shown in the upwind area. That is, from the cloud existing in the inside area of the seeding line, it may be identified that the water concentration of precipitation particles increased due to an influence of the seeding material. That is, the effect resulting from seeding may be identified. In conclusion, referring to FIG. 8, it may be identified that there is no interference (i.e., inflow) of an external cloud, and that the meaningful effect of the seeding experiment is obtained.

The comparison and analysis unit 300 may compare the first piece of observation information with the second piece of observation information, and may provide the seeding effect analysis unit 400 with a result of the comparison.

The seeding effect analysis unit 400 may find that the seeding effect is effect according to the result of the comparison, and accordingly, may analyze the effect resulting from the seeding experiment. The present invention is not related to analyzing the seeding effect, but may adopt all conventional methods of analyzing seeding effects.

Accordingly, the seeding effect analysis unit 400 is not an essential constituent element of the physical verification system used in the aerial experiment for the artificial rainfall according to the present invention, but may selectively be included in the physical verification system used in the aerial experiment for the artificial rainfall.

Hereinafter, a precipitation increase verification method performed in the precipitation increase verification system configured as mentioned above will be explained with reference to FIG. 9.

Figure 9:
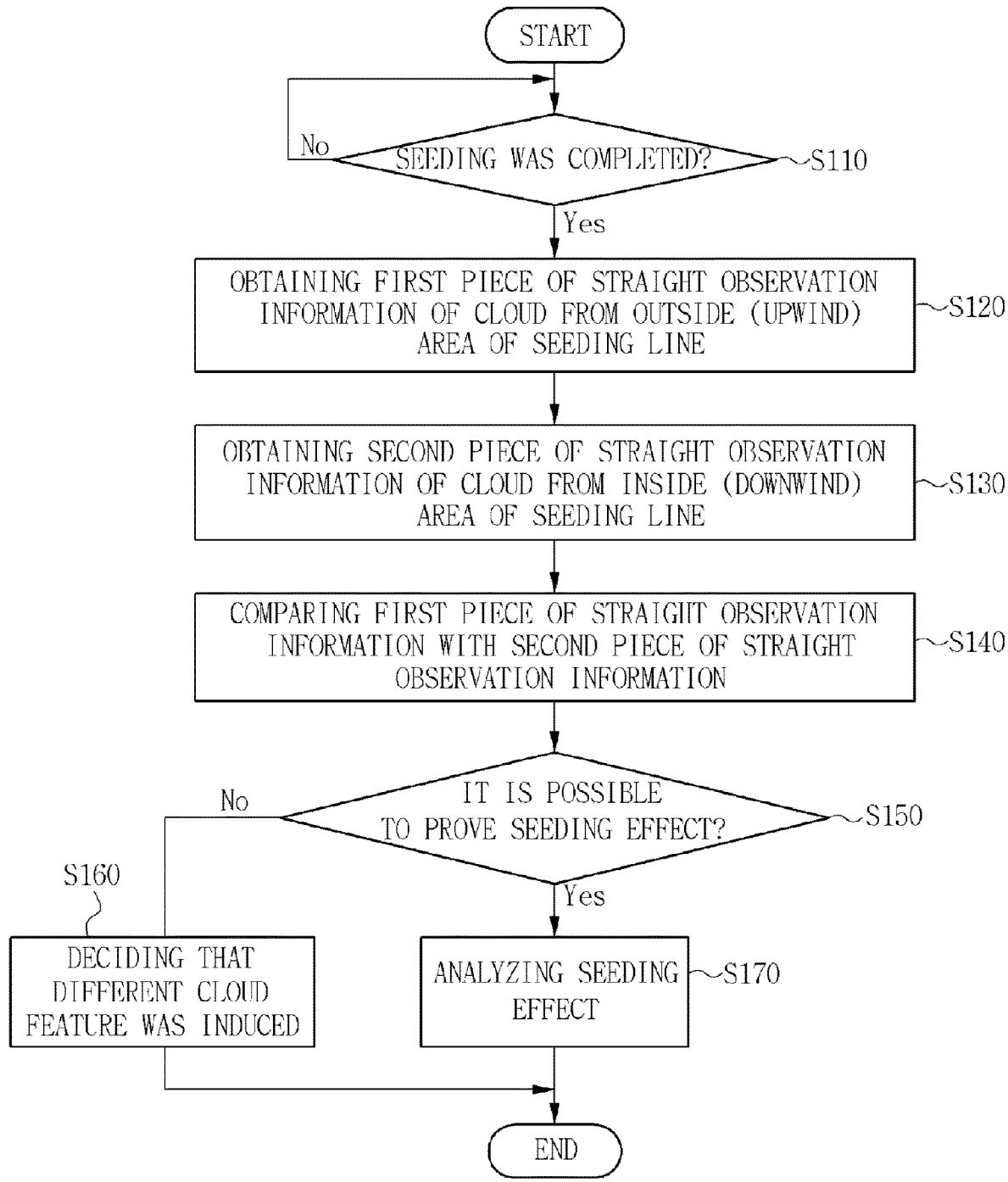
FIG. 9 illustrates a flow chart showing a method of verifying an increase in precipitation according to the other embodiment of the present invention.

FIG. 9 illustrates a flow chart showing the precipitation increase verification method according to one embodiment of the present invention.

Referring to FIG. 9, in step S110, first of all, the precipitation increase verification system 1000 determines whether or not a seeding experiment was completed.

When the seeding experiment was completed, in step S120, the precipitation increase verification system 1000 may obtain a first piece of straight observation information of a cloud by performing straight observations in the outside (i.e., upwind) area of the seeding line. This information is used in determining whether or not a natural cloud flowed into an area which is not affected by a seeding material, and comparing this cloud with the cloud targeted for the experiment existing in a region which is affected by the seeding material.

According to the present embodiment, even though the observation information is straight observation information, the present invention is not limited thereto, but may include all kinds of observation information that would have been obvious to those having ordinary skill in the art.

After then, in step S130, the precipitation increase verification system 1000 may obtain a second piece of straight observation information by performing straight observations in the inside (i.e., downwind) area of the seeding line. This information is used in measuring a cloud feature changed due to seeding in the area (i.e., the downwind area) which is affected by the seeding material.

The first piece of observation information and/or the second piece of observation information may be quantified at an average water concentration according to each size of cloud particles, even though it is not illustrated.

Subsequently, in step S140, the precipitation increase verification system 1000 may compare the first piece of straight observation information with the second piece of straight observation information. In step S150, the precipitation increase verification system 1000 may determine whether or not the first piece of straight observation information falls within a linear scope based on the second piece of straight observation information.

As mentioned above, in case that cloud features shown in two areas, the inside area (i.e., the region in which the seeding material is diffused) and the outside area (i.e., the region which is not affected by the seeding material) are different from each other, the precipitation increase verification system 1000 may determine that the influx of an external main cause (i.e., the inflow of an external cloud) exists.

In such a case, the precipitation increase verification system 1000 may determine that it is difficult to prove a seeding effect. That is, although there is a seeding effect, reliability on the observation information may be reduced. In such a case, although the seeding experiment is effective, based on the observation information, no correct seeding effect may be analyzed due to the influx of the external main cause.

When the first piece of straight observation information does not fall within the linear scope based on the second piece of straight observation information, that is, it deviates from the linear scope, in step S160, the precipitation increase verification system 1000 may decide that an external cloud having a different feature flowed.

When the first piece of straight observation information falls within the linear scope based on the second piece of straight observation information, in step S170, the precipitation increase verification system 1000 may determine that it is possible to prove a seeding effect based on corresponding observation information, and may analyze the seeding effect.

As mentioned above, according to the embodiments of the present invention, the method of verifying an increase in precipitation through observations performed in the upwind and downwind areas after the aerial experiment for the artificial rainfall, and comparative analysis can be provided. According to these embodiments of the present invention, a design technology for a verification line of the effects resulting from the aerial experiment for the artificial rainfall can be performed. Furthermore, as the cloud physics-based observation equipment mounted into the experimental aircraft is utilized, a minute physical change in the cloud due to seeding can be proved, so scientific reliability of this experiment can be enhanced.

As previously described, in the detailed description of the invention, having described the detailed exemplary embodiments of the invention. However, it should be apparent that modifications and variations can be made without deviating from the scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A method of verifying an increase in precipitation, comprising:
    spraying artificial cloud seeds for a seeding experiment;
    obtaining, by an aerial observation equipment including a cloud condensation nucleus counter, a cloud combination probe, and a precipitation imaging probe, a first piece of observation information from an upwind area after the seeding experiment;
    obtaining, by the aerial observation equipment, a second piece of observation information from a downwind area after the seeding experiment;
    comparing, by a verification system including the aerial observation equipment, the first piece of observation information with the second piece of observation information, and thus determining, by the verification system, whether or not the first piece of observation information falls within a linear scope based on the second piece of observation information;
    determining, by the verification system, that an effect resulting from the seeding experiment can be proved when the first piece of observation information falls within the linear scope based on the second piece of observation information, and
    deciding, by the verification system, that a cloud having a different feature flowed into at least one of the upwind area and the downwind area when the first piece of observation information and the second piece of observation information deviate from the linear scope.

2. The method of claim 1 wherein the observation information comprises vertical observation information and straight observation information.

3. The method of claim 1 wherein the aerial observation equipment comprises at least one of: an aerial data investigation system 118 (i.e., Aircraft Integrated Meteorological Measuring System-20, AIMMS-20); a water content measurement instrument (i.e., Multi-Element Water Content System, WCM-2000); a cloud particle combination measurement instrument (i.e., Cloud Combination Probe); and a precipitation particle measurement instrument (i.e., Precipitation Imaging Probe).

4. A verification system of verifying an increase in precipitation, comprising:
    an aerial observation equipment configured to obtain a first piece of observation information from a upwind area and a second piece of observation information from a downwind area after a seeding experiment, the aerial observation equipment including a cloud condensation nucleus counter, a cloud combination probe, and a precipitation imaging probe,
    wherein the verification system is configured to spray artificial cloud seeds using an aircraft for the seeding experiment,
    wherein the verification system is configured to compare the first piece of observation information with the second piece of observation information so as to determine whether or not the first piece of observation information falls within a linear scope based on the second piece of observation information, and determine that an effect of the seeding experiment can be proved when the first piece of observation information falls within the linear scope based on the second piece of observation information, and
    wherein the verification system further decides that a cloud having a different feature flowed into at least one of the upwind area and the downwind area when the first piece of observation information deviates from the linear scope based on the second piece of observation information.

5. The system of claim 4 wherein the observation information comprises vertical observation information and straight observation information.

6. The system of claim 4 wherein the aerial observation equipment comprises at least one of: an aerial data investigation system (i.e., Aircraft Integrated Meteorological Measuring System-20), a water content measurement instrument (i.e., Multi-Element Water Content System); a cloud particle combination measurement instrument (i.e., Cloud Combination Probe); and a precipitation particle measurement instrument (i.e., Precipitation Imaging Probe).

7. The system of claim 4, wherein the verification system is further configured to quantify at least one of the first piece of observation information and the second piece of observation information.

8. The system of claim 7 wherein the verification system quantifies at least one of the first piece of observation information and the second piece of observation information at an average water concentration according to each size of cloud particles.

9. The system of claim 4, further comprising a seeding effect analyzer configured to analyze a seeding effect resulting from the seeding experiment.

\* \* \* \* \*